April 14, 1959      J. J. REILLY      2,881,898
CONVEYING EQUIPMENT
Filed July 13, 1955      2 Sheets-Sheet 1
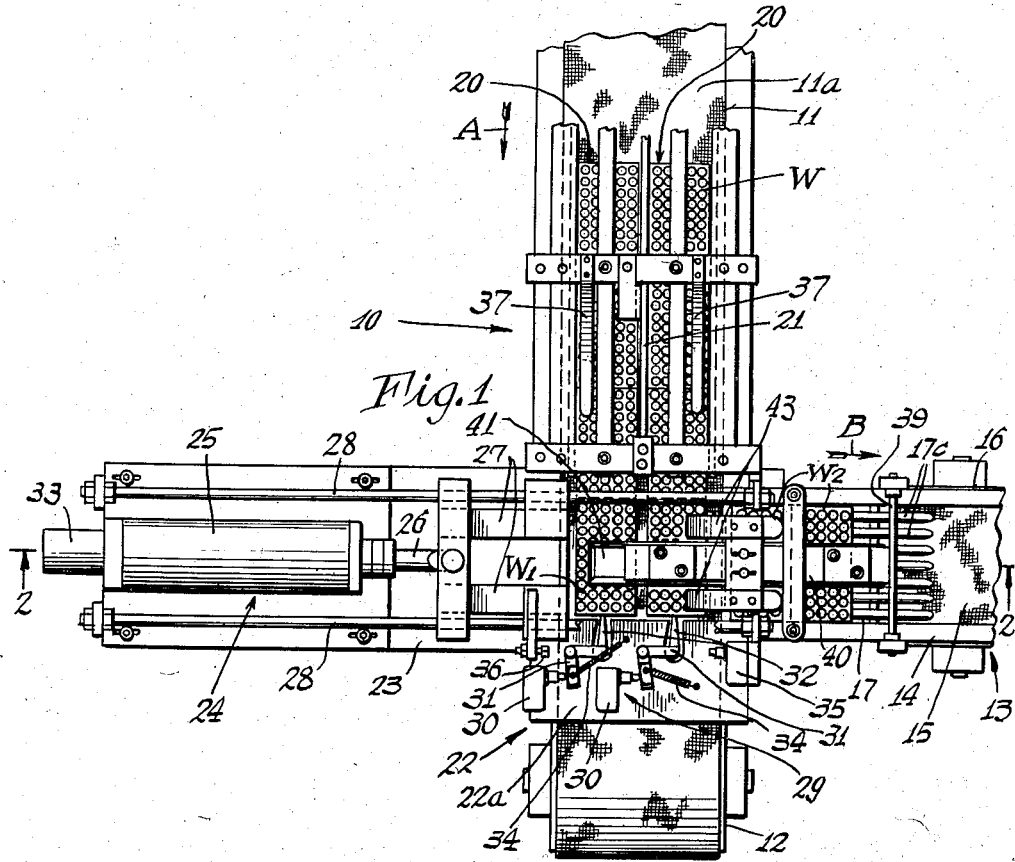
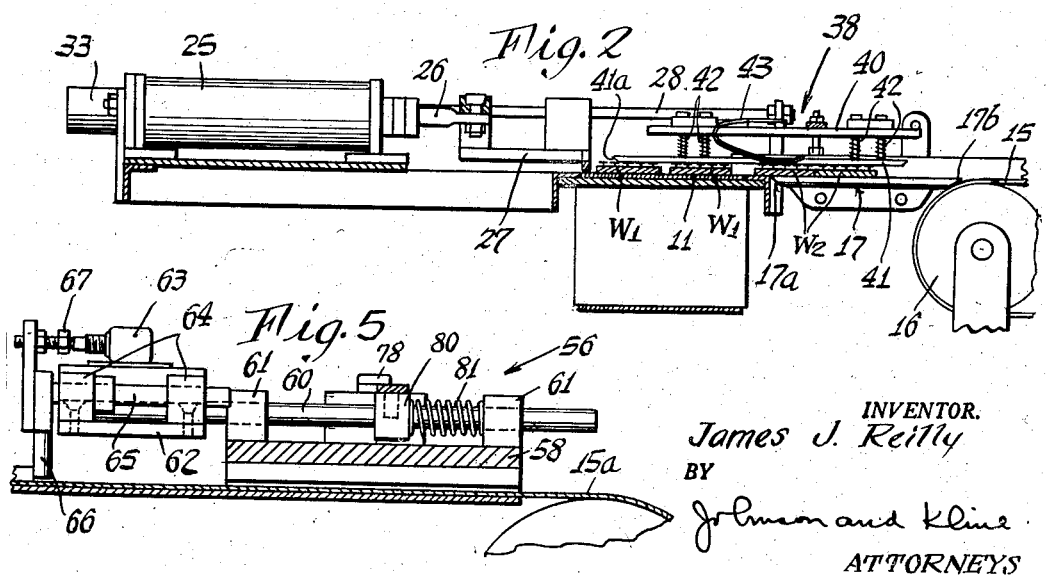
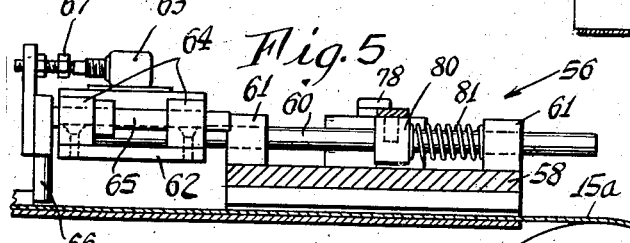
INVENTOR.
James J. Reilly
BY
Johnson and Kline
ATTORNEYS April 14, 1959
J. J. REILLY
2,881,898
CONVEYING EQUIPMENT
Filed July 13, 1955
2 Sheets-Sheet 2
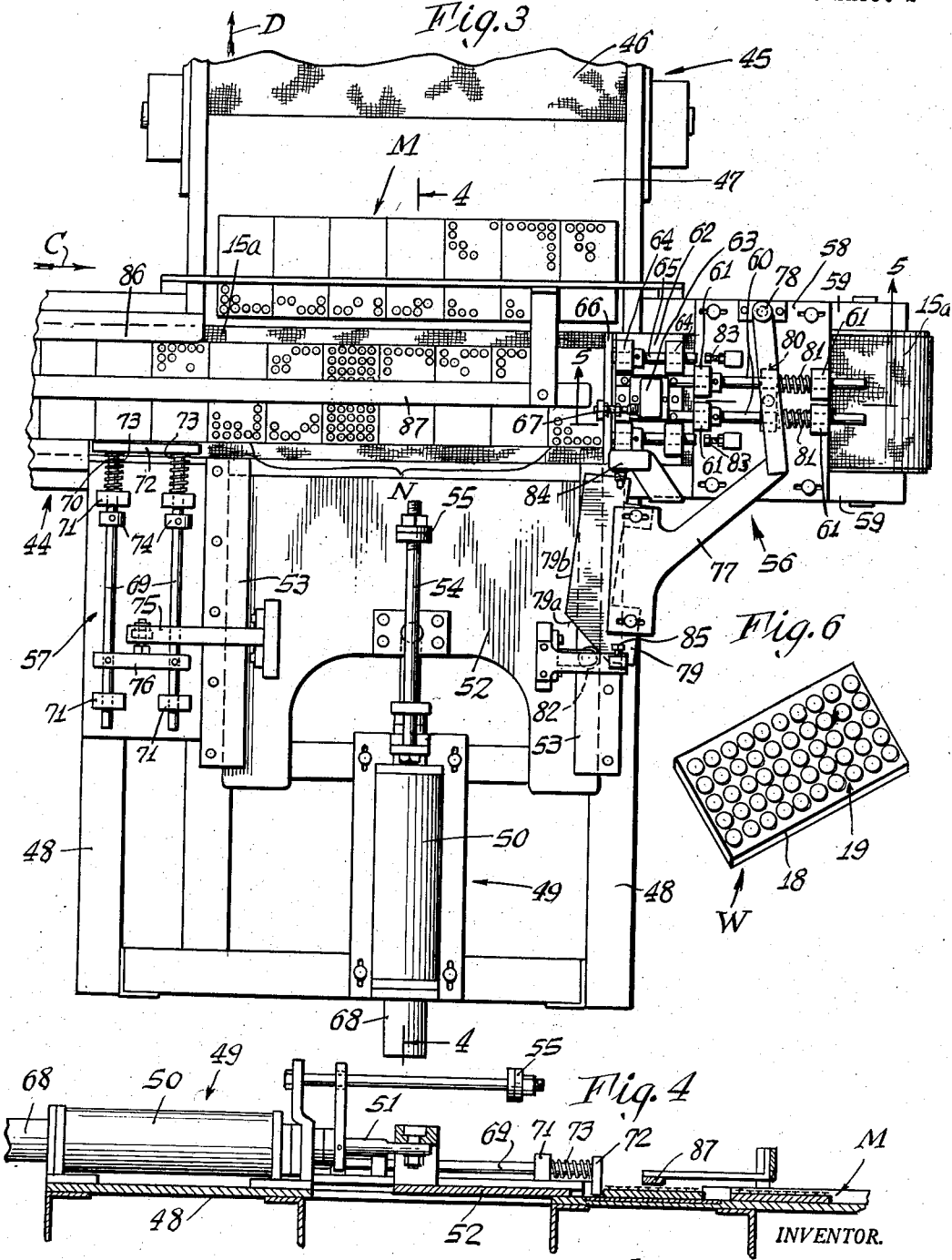
INVENTOR.
James J. Reilly
BY
Johnson and Kline
ATTORNEYS United States Patent Office 2,881,898
Patented Apr. 14, 1959

2,881,898

CONVEYING EQUIPMENT

James J. Reilly, Derby, Conn., assignor, by mesne assignments, to The Shelton Tack Company, Shelton, Conn., a corporation of Connecticut Application July 13, 1955, Serial No. 521,673

10 Claims. (Cl. 198—31)

This invention relates to an automatic material handling apparatus, and more particularly to a conveying means for automatically transporting articles individually or in groups successively, one behind the other, along a predetermined path in a predetermined manner and in particular relationship to each other.

The apparatus of the type herein illustrated and described has particular utility in connection with the moving and handling of articles automatically from station to station of a manufacturing operation or process, wherein a series of steps is required to be performed on the articles, each step being performed at its respective station.

While the invention of the present application can be used in conjunction with various other kinds of material handling operations, manufacturing processes or assembling operations, the novel apparatus is herein described with particular reference to the handling of an article of manufacture in the nature of a thumb tack package during the manufacture and/or forming of the same.

Usually a thumb tack package or the like consists of an orderly array of tacks impaled to a rectangularly-shaped board wherein the operational steps of forming the above package consist of (1) arraying the tacks in an orderly manner, (2) impaling the board to the array, (3) coating the heads of the tacks, if desired, with a suitable cover therefor, and (4) wrapping the board and impaled tacks thereto in a suitable wrapper. Generally these operations are performed in successive steps at remote stations. Therefore, because the above assembly or manufacturing operation required intermediate material handling operation for moving the necessary articles to the various stages of manufacture, much effort, time and expenditure was wasted or expended in moving the articles from station to station.

Further, because of limited space and/or because of the nature of the manufacturing process or assembly, it was oftentimes impossible or impractical to arrange the various stations at which a manufacturing operation was to be performed in a straight line. For this reason it was necessary that the articles during a manufacturing process be moved in a path or line which was other than straight. As a result the articles heretofore had to be individually handled in order that they could be moved into proper position at each station. If automation was desirable, relatively expensive and complex conveying systems had to be utilized, to move the articles automatically along irregular lines of travel necessitated by the nature of the operation and/or limitation of space.

An object of this invention is to provide a relatively simple and inexpensive means for moving articles successively in line individually or in groups, one after the other, from station to station of a manufacturing process or operation wherein the direction of movement of the article is automatically changed to facilitate the carrying out of the manufacturing operation in a continuous, uninterrupted, automatic manner.

Another object of this invention is to provide an automatic means whereby the direction of travel of the article is changed only upon the backing up of a predeterminate number of articles in the line or by a predeterminate force exerted by the articles in line.

Another object of this invention is to provide a conveying means having means whereby a portion of the line of backed-up articles is restrained from movement while the end portion of the line is moved in a direction different from that of the main line of backed-up articles.

It is another object of this invention to provide means whereby a line of individual unit articles moving in abutting relationship is broken so that an end portion thereof is moved independently and relative to the main portion of the line slightly and in the same direction so as to eliminate sliding friction with the main body of the line as the end portion thereof is moved in a direction transversely of the main line portion.

It is another object of this invention to provide means whereby articles are successively moved, one after the other, in a column in one direction, and whereby a portion of said column is separated therefrom and moved in a different direction in the form of rows consisting of a predeterminate number of articles.

These objects are accomplished by connecting a series of stations performing the operations of forming a tack package with a novel conveyor means whereby the packages or portions thereof are received by the conveyor at one station thereof, and carried thereon automatically to a succeeding station where a subsequent operation is to be performed. Because of limited space and/or because of the nature of the operation, it is necessary that the articles in moving from station to station travel in a line which is other than straight.

According to the present invention this is accomplished by angularly disposing a plurality of endless belt type conveyor means in juxtaposed relationship so that the direction of travel of the articles carried thereby may assume a desired path whereby articles are transferred from one conveyor to the other automatically. The end portions of a pair of angularly disposed conveyor means are juxtaposed so as to form a junction thereat, one of the angularly disposed conveyor legs being provided with means for moving the articles successively, one behind the other, in a column toward said junction, and the other leg portion having means for moving a portion of said column of articles away from the junction in the form of a row comprising a predeterminate number of articles. Stop means positioned adjacent the junction halt the moving column of articles traveling in the direction toward the junction; and a laterally disposed transfer means or pusher positioned adjacent the junction is operatively associated with the stop means. The arrangement is such that a predetermined force exerted by the column of articles on the stop means actuates an operating means associated therewith to operate the pusher or transfer means. Upon operation of the latter, the pusher engages the end portion of the column of articles next said stop means and transversely displaces the same onto said other angularly disposed portion of the conveyor means whereby the driving means thereof moves the displaced end portion of the line of articles away from said junction and in a direction different from said main portion of the line.

According to this invention the pusher or transfer means functions as a means for restraining movement of the column of articles toward the junction as it laterally displaces the end portion of the line next the stop means.

In an adaptation of the present invention a securing means is transversely spaced from the stop means and both are operatively associated with the transfer means so that upon the actuation of an operating means associated with the stop means by a predeterminate force exerted by the articles thereon, the pusher or transfer means is actuated and releases the securing means to clamp an intermediate portion of the column or line against movement toward the junction. Further the pusher operatively connected to the stop means enables the latter to recede slightly in the direction of the movement of the articles toward the junction so that the end portion of the line of articles adjacent the stop means is moved slightly relative to the main body of the articles due to the action of the conveyor. This slight movement enables the end portion of the line to be spaced slightly therefrom and is engaged by the pusher. Continual movement of the pusher causes the end portion of the articles to be displaced laterally so that the displaced portion is transferred onto the other adjacent conveyor means. In this manner it will be noted that the friction between the end portion and the main portion of the line clamped by the securing means is eliminated during the transfer or lateral displacement of the former.

Also, resilient guide means are provided which are spaced from the surface of the conveyor an amount sufficient to permit the articles carried thereby to be readily moved thereunder. In this manner the articles are prevented from riding over onto each other as they are moved from station to station and as they are transferred from one conveyor to another. If desired, aperture means are further provided adjacent the portion of the junction leading away therefrom whereby the tacks which, should they become loose from the board for any reason, are permitted to fall therethrough, thus preventing jamming of the articles at the junction.

A feature of this invention resides in the provision of operating means for actuating the pusher only by a predeterminate force exerted thereon by the line of articles moving toward the junction.

Another feature of this invention resides in the reciprocating pusher or transfer means which is automatically operated to displace an end portion of a line of articles laterally thus causing the direction of said articles to be changed.

Another feature of this invention resides in the provision of resilient guide means for guiding the articles toward and away from the said junction.

Another feature of this invention resides in the provision of an aperture means adjacent the junction whereby accumulation of loose tacks is permitted to fall therethrough and be collected to prevent jamming.

Still another feature of this invention resides in the provision that the movable or working parts thereof are readily exposed and accessible to repair or replacement.

Another feature of this invention resides in the relative simplicity of the novel conveying means which is positive in operation and inexpensive to operate.

Other features and advantages will be apparent from the specification and claims when considered with the drawings in which:

Figure 1 is a plan view of the novel conveyong means whereby the path or direction of movement of a line of successively moving articles may be changed.

Fig. 2 is a vertical sectional view taken along line 2—2 of Fig. 1.

Fig. 3 is a plan view of an adaptation of the invention illustrated in Fig. 1 whereby a predetermined number of articles are transversely moved in a row away from the junction.

Fig. 4 is a side sectional view taken along line 4—4 of Fig. 3.

Fig. 5 is a sectional view in elevation taken along line 5—5 of Fig. 3.

Fig. 6 is a detail perspective view of a tack package with which the illustrated form of the invention has particular utility for conveying the same from station to station.

According to this invention, the various stations performing the steps of a manufacturing operation, which for the purpose of the following description is a tack packaging operation, are connected by a novel conveying means. Thus, the utilization of the conveying means according to this invention enables the articles being worked upon to be automatically transported from one station to another along a predetermined path in a predetermined manner and in particular relationship to each other which requires a minimum of attention and/or manual handling of the same.

Accordingly, the conveying means of the present invention consists of a plurality of conveyong means which are angularly disposed so that the direction of the articles carried thereon can travel or be moved in any desired path or line. As illustrated the conveying means are disposed at right angles.

Referring to Figs. 1 and 2, the automatic material-handling apparatus of the present invention consists of an elongated conveying means 10 having a horizontally extending endless belt 11 passing over a tail pulley 12 and a suitable forward pulley (not shown). The conveyor 10 is further provided with suitable drive means (not shown) by which the upper surface 11a of the conveyor belt 11 advances continuously in a direction indicated by arrow A. Thus, any article or workpiece W positioned on the belt is normally carried forward.

Angularly disposed adjacent the tail end of the conveyor 10 is a second conveyor 13 having a forward portion 14 thereof juxtaposed the tail portion of the conveyor 10. The second conveyor 13 is similar in construction to that of the first mentioned conveyor means in that it consists of an endless belt 15 passing over the forward pulley 16 and suitable tail pulley and also has suitable power means (not shown) for driving the belt 15 continuously in the direction indicated by arrow B.

Disposed between the conveyors 10 and 13 adjacent the juxtaposed end portions thereof is a table 17 which together with the juxtaposed end portions forms a junction at which the direction of the articles W carried thereon is changed.

As best seen in Fig. 2, the table 17 is positioned at substantially the same height as the upper surface of belts 11 and 15. Also, it will be noted that an edge portion 17a of the table is positioned closely adjacent the belt 11 and the opposite edge 17b thereof positioned adjacent the forward pulley 16.

Thus, the change of direction of an article is accomplished by providing means for laterally transferring the same from one conveyor onto the table and then onto the other conveyor.

The upper end of the conveyor 10 (not shown) is operatively associated for the purpose of this description with a station performing the impaling operation of a tack package forming operation. At this station, not shown, the board 18 is automatically impaled to an array of tacks 19 forming an article W as illustrated by Fig. 6. These articles as they are formed are automatically positioned on the conveyor, which operation is not within the scope of this invention.

The articles are then carried forward in the direction toward the junction in a column as illustrated in Fig. 1 by the continuously moving belt 11 so that the articles can be automatically moved to a subsequent station. While it will be understood that the conveyor 10 may accommodate any number of article columns 20 advancing toward the junction, the illustrated form of the invention illustrates two such columns of articles. To maintain the unit articles W in a column as they advance is a separator 21 positioned to extend longitudinally of the conveyor. Thus the separator 21 divides the conveyor 10 so that the articles W traveling thereon are guided therealong successively one behind the other in adjacent columns.

Positioned adjacent the tail end of the conveyor 10 and extending transversely thereacross is a stop means 22 in the form of a plate 22a. As illustrated in Fig. 1, when the foremost article $W_1$ of the column engages the plate, it is halted, thereby causing each succeeding article to be stopped on contact with the article preceding it.

Extending laterally of the conveyor 10 adjacent the junction portion thereof and in line with conveyor 13 is a support 23 on which there is mounted a transfer means 24.

According to this invention the transfer means 24 includes a cylinder 25 having a reciprocating piston rod 26. Connected to the end of the rod 26 is a pusher plate 27. Upon actuation of the transfer means 24 the piston rod 26 is extended causing the pusher plate 27 to engage the edge portion of the article $W_1$ or forwardmost portion of the column next the stop plate 22a and forces the articles $W_1$ to be laterally displaced. Thus upon successive operations of the pusher plate 27, succeeding end portions of the column are laterally displaced so that each laterally displaced portion pushes ahead the preceding displaced portion $W_2$ across the table 17 and onto the belt 15 of the second conveyor 13 which carries the same away from the junction in the direction of arrow B. In this manner articles may be automatically delivered from station to station, not in a straight line, with a minimum of attention or manual handling of the same. If desired, guide rods 28, as shown, are provided for guiding the pusher plate laterally.

While the piston rod may be power operated by any suitable means, in the form illustrated it is pneumatically operated by a double acting solenoid 33 controlling a supply of compressed air entering the cylinder.

In order that the transfer means 24 can be automatically actuated and preferably only when an article W is presented adjacent the stop means 22, there is associated with the stop means 22 an operating mechanism 29 for accomplishing the same. The arrangement of the operating means 29 is such that it will be actuated only by the predeterminate force exerted by the column of articles 20 which are backed up as illustrated in Fig. 1. Also, the operating means is arranged so that the predeterminate force required to actuate the same must be applied by each column of articles being moved by the conveyor 10. In other words, when the conveyor 10 is arranged to move a plurality of columns as illustrated in Figs. 1 and 2, the pusher is rendered inactive as long as any column is not abutting against the stop plate 22a.

As best viewed in Fig. 1 the operating mechanism consists of a switch 30, one for each column for controlling the solenoid 33 of the cylinder. The switches 30 are automatically actuated by a bell crank lever 31 having connected at one end an actuator 32 adapted to be engaged by the forwardmost article of each column. A spring 34 connected to the bell crank and anchored to the stop plate 22a normally urges the bell crank 31 out of engagement with the switch so that the latter is normally open. Therefore, in order for the switch to be actuated the force exerted by the column must overcome the force of the spring 34. By adjusting the tension or resiliency of the spring 34, the predeterminate force necessary to actuate the switch can be controlled. This feature is particularly desirable to insure that a sufficient number of articles are in line so that successive and continued operation is assured.

Preferably the switches are connected in series so that each switch must be closed before the solenoid 33 is actuated to energize the pusher plate. Therefore, it will be noted that when a sufficient number of articles W are advancing toward the junction, the switches 30 are actuated on contact with the lead article $W_1$ of each column which causes the piston rod 26 to move outwardly in the direction transversely of the column 20 whereby it transversely displaces the forwardmost portion of the column. The pusher plate 27, it will be noted, restrains the columns 20 from advancing while the forward portion thereof is being laterally displaced during the transfer operation.

To return the pusher plate to normal inoperative position upon the completion of the transfer stroke, a switch 35 connected to the solenoid 33 is positioned adjacent the end of the stroke whereupon an adjustable actuator 36 carried by the pusher plate engages the switch. Upon the closing of the switch 35 the solenoid is energized, allowing the piston rod to return the pusher plate to normal starting position shown in Fig. 1. Upon the return of the pusher plate, the columns are no longer obstructed thereby and the belt 11 carries forward the column so that the next succeeding article $W_3$ engages the switches 30, thereby initiating the cycle again. If desired, resilient fingers 37 are positioned above the column of articles 20 and extend longitudinally thereof so as to prevent the articles from riding over onto each other as the articles are halted.

Since some of the tacks may be loosely impaled to the board, the vibration and movement of the articles on the conveyor may cause these loose tacks to be jarred loose and accumulate on the conveyor belt. Therefore, to avoid any possible jamming at the junction due to the loosened tacks accumulating on the conveyors, the table portion 17 between the conveyors is provided with perforations or spaced bars 17c so that the loose tacks may drop therethrough and be collected in a suitable container disposed thereunder.

If desired, a resilient guide means 38 is pivotally mounted on rod 39 adjacent the junction. The guide means, illustrated in Figs. 1 and 2, consists of a pair of spaced plate members 40—41 which are resiliently spaced by suitable spring members 42, the lower plate member 41 being spaced from the upper surface of the conveyor belt 15 and the table 17 an amount sufficient to provide the passage of the articles W thereunder. Since the tacks may not always project a uniform height above the board 18 the ends of the plate 41 are provided with an inclined surface 41a so that the resiliently mounted lower plate 41 may be upwardly cammed to permit passage of tack packages thereunder should some of the tacks thereon not be of uniform height.

A resilient flat spring 43 associated with the guide means 38 further facilitates the movement of the articles W thereunder and prevents the articles which are traveling in succeeding and abutting relationship from riding onto each other during lateral displacement thereof.

An adaptation of the foregoing invention provides a means for separating and spacing the end portion of a column of abutting articles from the main body of the column so that the separated end portions thereof can be transversely or laterally displaced and moved in another direction in the form of succeeding rows consisting of a predeterminate number of articles. The means provide that the spacing occur before the change in the direction of travel is effected, so that the transversal displacement of the separated end portion eliminates any friction which would otherwise result between the adjacent articles at the "break point" during lateral transfer of the same.

Referring particularly to Figs. 3–5 this is accomplished by angularly disposing a pair of conveyor means 44 and 45 in a manner and kind heretofore described.

In the illustrated form, Fig. 3, the conveyor 44 can be a continuation of the conveyor 13 illustrated in Fig. 1. However, it will be understood that the conveyor 44 can be associated with a station performing a manufacturing operation in a manner similarly described with reference to conveyor 10.

The endless belt 15a of conveyor 44 is illustrated as moving in the direction of arrow C. The other conveyor 45 disposed at right angles thereto has its endless belt 46 which is driven by suitable power means (not shown), moving in the direction of arrow D. As it will be apparent from Fig. 3 the width of the conveyor 45 is considerably wider than the width of conveyor 44, for reasons which will hereinafter appear, and disposed between the justaposed end portions of conveyors 44 and 45 is a table portion 47 forming therewith the junction.

Projecting laterally of the conveyor 44 and in line with conveyor 45 is a supporting structure 48 having mounted thereon a transfer means 49. The transfer means includes a cylinder 50 and piston rod 51 similar to that hereinbefore described. However, connected to the piston rod there is a pusher plate 52 which is adapted to be moved outwardly to engage the edge portion of the predeterminate number of articles of the forwardmost end of the column so that the same can be transversely positioned onto the other conveyor. In the instant case seven such articles may be so engaged by the pusher. However, it is apparent that the number may be varied as desired by varying the width of the pusher.

To facilitate guiding of the pusher plate during a transfer operation, a Z-shaped guide 53 positioned on the support adjacent the edges of the pusher forms a guideway between which the pusher plate is adapted to slide. Also, if desired, a guide rod 54 to which the pusher is slidably connected aids in guiding the same. A stop 55 at the end of the guide rod limits the outward movement of the pusher.

Operatively associated with the pusher plate is a stop means 56 for halting the column of articles as it approaches the end of the junction. A securing means 57 spaced upstream from the stop means 56 is likewise operatively associated with the pusher plate, and as it will be hereinafter described, the securing means clamps an intermediate portion of the column or article immediately beyond the "break point" to restrain the main portion of the column from moving forwardly as the forwardmost end is being spaced therefrom for subsequent lateral displacement by the pusher.

The stop means 56 according to the adaptation as shown by Fig. 3 is rendered movable relative to the continuously moving belt 15a a distance sufficient to slightly space the forwardmost portion of the column, i.e. the first seven articles, from the main portion of the column. As illustrated in Fig. 3 and Fig. 5, the stop means 56 includes a base plate 58 which is fixed to the support 59 of the conveyor 44 and has mounted thereon a pair of spaced parallel rods 60 slidably mounted in suitable bearings 61. The inner end of the rods 60 has fixed thereto a flat plate 62 having mounted thereon a normally open switch means 63, the switch means being adapted to energize a double-acting solenoid 68 to operate the cylinder when closed. The plate 62 is further provided with a plurality of bearings 64 having frictionally slidably supported therein a pair of spaced rods 65 having connected to the inner ends thereof a vertically disposed stop wall 66 which functions as a limit stop to halt the column of articles as the latter approaches the end of the junction. Thus from this construction it will be noted that the stop wall 66 is rendered movable relative to the flat plate 62 which in turn is movable relative to the base 58.

Located on the stop wall 66 is an actuator 67 which is adapted to close the switch means 63 for energizing a double acting solenoid 68 controlling movement of the pusher plate 52.

Accordingly, as the column of closely adjacent or abutting articles is moved toward the junction, the foremost article on contact with the stop wall 66 halts, and each succeeding article is also brought to a stop upon contact with the preceding article as illustrated in Fig. 3. However, the endless belt 15a continues to move beneath the said column and normally tends to urge the articles toward the stop wall 66. When a predetermined force is built up and exterted by the column of articles and applied to the stop wall 66, the force thereof causes the slidably mounted stop wall to be moved slightly in the direction of the moving belt 15a an amount sufficient for the actuator 67 to close the switch 63 to actuate the pusher plate 52.

When the pusher plate 52 is thus actuated, the plate 62 supporting the stop wall 66 is moved further to the right, as will be hereinafter described, after the switch 63 is closed, as viewed in Fig. 3, an amount sufficient to space an end portion of the column from the main portion thereof. This is accomplished by operatively associating the securing means 57 and stop means 56 with the pusher plate, so that upon initial movement thereof the securing means 57 associated therewith causes an intermediate portion of the column to be clamped and restrained from being carried forwardly by the continuously moving belt 15a, while the stop wall 66 is moved to the right substantially simultaneously therewith to provide the end portion, forwardly of the clamp or securing means, to be spaced therefrom. Continued movement of the pusher 52 causes the latter to engage the forwardmost end portion of the column of articles to displace the same transversely in succeeding rows of a predeterminate number of articles without friction between the adjacent articles at the "break point."

The securing means 57 operatively associated with the pusher plate and positioned adjacent thereto includes a pair of spaced bars 69 laterally disposed having the end portions 70 thereof closely positioned to an intermediate portion of the column. The bars are slidably mounted in suitable bearings 71 and have connected to the ends thereof a clamping jaw 72 which is adapted to engage the article next beyond the "break point" of the column. A spring 73 disposed between the jaw 72 and a collar 74 fixed adjacent the end 70 of the bars normally urges the jaw into clamping position. However, a projection 75 mounted on the pusher plate engages a tie bar 76 connecting the bars to normally maintain the clamping jaw 72 out of engagement with the articles in the column when the pusher is in inoperative position as illustrated in Fig. 3.

In order that the stop means 56 can recede or move to the right, as viewed in Fig. 3, substantially simultaneously upon the actuation of the securing means, the stop means is provided with a lever 77 pivoted to the base plate at one end 78 and has the other end thereof connected to the free end of the camming plate 79 pivotally mounted adjacent the pusher plate. The lever 77 has connected thereto a collar 80 which is fixed to the rods 60 to that when the lever 77 is pivoted the collar 80 causes the rods 60 to slide to the right, thus moving the plate 62 and the stop wall 66 to the right also. If desired, spring means 81 are disposed between the collar 80 and bearings 61 to urge the lever and rods connected thereto to the left upon release thereof.

As shown the cam plate 79 is provided with an inclined portion 79a which is engaged by a cam follower or roller 82 mounted on the pusher plate which tends to urge the cam plate outwardly upon initial movement of the pusher. The cam plate 79 is also provided with a straight cam surface 79b which is engaged by the cam follower 82 on continued movement of the pusher plate to maintain the cam plate 79 and lever 77 connected thereto in the pivoted position during the travel of the pusher plate transversely. While the cam follower 82 is on the straight cam surface 79b of the cam plate, the stop wall 66 is at its extreme right limit, thus allowing the end portion of the column to be moved to the right an equal amount to space it from the remainder of the column and to be in position to be engaged by the pusher. Thus it will be apparent that as the cam plate 79 is pivoted outwardly the lever 77 connected to the rods 60 will cause the latter to be moved to the right, thus causing the flat plate 62 on which the stop wall 66 is mounted to be likewise moved to the right. The spring means 81 disposed between the collar and the bearing on the rods 60 normally re-positions the stop means when the pusher plate 52 is retracted to its normal inoperative position.

In order that the switch 63 may be positively opened the base plate 58 is provided with a pair of actuators 83 aligned with the rods 65. Thus when the plate 62 carrying the stop wall 66 is moved to the right, the rods 65 are engaged by the actuators 83 and limit further movement of the stop wall to the right. However, the plate 62 carrying the switch 63 continues to move away therefrom an amount sufficient to enable the switch to be opened.

To return the pusher plate to inoperative position, a second switch means 84 is fixed to the support 59 and is located so as to be engaged by an actuator 85 carried by a pusher plate. Thus as the pusher reaches the limit of its stroke, the actuator 85 closes the switch 84 which energizes the solenoid 68 for actuating the cylinder to return the pusher to its normal position.

In operation, when the predeterminate force exerted by the column causes the stop wall 66 to move slightly to the right closing the switch 63, the cylinder 50 is primed causing the piston rod 51 to move the pusher plate 52 outwardly to engage the end portion of the column. Initial movement of the pusher 52, and before it engages the forwardmost articles in the column, allows the securing means 57 to be released whereby the springs 73 urge the clamping jaw 72 against the article next to the "break point," the article being wedged between the jaw and the side 86 of the conveyor to prevent any further forward movement of the column of articles therebehind.

Also, because the stop means are likewise operatively associated with the stop wall 66, the latter recedes to the right, as viewed from Fig. 3, before the pusher engages the article. Thus as the stop wall moves to the right, the end portion of the column is likewise moved to the right due to the action of the continuously moving belt 15a, and the forwardmost articles are carried forward to space the same and to position the same in a position whereby the advancing pusher 52 may engage the end portion to laterally displace the same as a row. As seen in Fig. 3, it will be noted that the displaced row of articles M (seven articles) is positioned to the right of the first seven succeeding articles N of the column about to be displaced as a result of the spacing movement.

If desired, guide means 87 are spaced from the surface of the belt an amount sufficient to allow the articles to pass thereunder, but insufficient to permit one article from riding over onto the adjacent preceding article.

Thus from the foregoing invention it will be noted that articles can be automatically transported from station to station, not in a straight line automatically, quickly and easily with a minimum of attention and manual handling. The operation of the present material handling means is relatively simple in structure, positive in operation and relatively inexpensive to manufacture. Further, the working parts are readily accessible for removal or repair, thus rendering the maintenance thereof quite simple.

Variations and modifications may be made within the scope of the claims and portions of the improvements may be used without others.

I claim:

1. An apparatus for carrying individual unit articles along a predetermined path in a predetermined manner comprising a conveying means having angularly disposed leg portions, said leg portions having juxtaposed end portions forming a junction thereat; means for causing said articles to travel one after the other successively in line along one of said leg portions; stop means for halting said line at said junction; securing means positioned adjacent said junction and adapted to clamp and unclamp an intermediate portion of said line; a transfer means adjacent said junction and positioned between said stop means and said securing means, said transfer means being adapted to move the end portion of said line of articles next said stop means onto said other leg portion, said transfer means being operatively associated with said securing means and said stop means; and operating means associated with said stop means for actuating said transfer means whereupon the operation of the latter causes the stop means to recede as the securing means clamps the intermediate portion of the line of said articles so that the end portion of the line between the stop means and the securing means is moved into position whereby the transfer means engages the same and moves said end portion onto said other leg portions.

2. An apparatus for carrying individual unit articles along a predetermined path in a predetermined manner comprising a conveying means having angularly disposed leg portions, said leg portions having juxtaposed end portions forming a junction thereat; driving means for causing said articles to travel one after the other successively in line along one of said leg portions; stop means for halting said line at said junction; securing means positioned adjacent said junction and adapted to clamp and unclamp an intermediate portion of said line; a transfer means adjacent said junction, said transfer means being adapted to move the end portion of said line of articles next said stop means transversely onto said other leg portion, said transfer means being operatively associated with said securing means and said stop means; operating means associated with said stop means for actuating said transfer means whereupon the operation of the latter causes the stop means to be displaced as the securing means clamps an intermediate portion of the line of said articles spaced from said stop means so that the end portion of the line between the stop means and the securing means is spaced from said clamped portion of the line and moved by said drive means into position whereby the transfer means engages the same to displace said end portion transversely onto said other leg portions; and means for moving said displaced portion away from said junction.

3. An apparatus for carrying individual unit articles along a predetermined path in a predetermined manner comprising a conveying means having angularly disposed leg portions, said leg portions having juxtaposed end portions forming a junction thereat; driving means for causing said articles to travel one after the other successively in line along one of said leg portions; stop means for halting said line at said junction; securing means spaced from said stop means and positioned adjacent said junction and adapted to clamp and unclamp an intermediate portion of said line; a transfer means adjacent said junction, said transfer means being adapted to move the end portion of said line of articles next said stop means transversely onto said other leg portion, said transfer means being operatively associated with said securing means and said stop means; operating means associated with said stop means for actuating said transfer means whereupon the operation of the latter causes the stop means to recede and the securing means to clamp the adjacent intermediate portion of the line of said articles spaced from said stop means, so that said driving means causes the end portion of the line between the stop means and the securing means to move away from said intermediate portion of the line so as to be free therefrom and moved into position whereby the transfer means engages the same and moves said end portion transversely onto said other leg portions; and means for moving said portion of the line away from said junction.

4. An apparatus for carrying individual unit articles along a predetermined path in a predetermined manner comprising a conveying means having angularly disposed leg portions, said leg portions having juxtaposed end portions forming a junction thereat; means for causing said articles to travel one after the other successively in line along one of said leg portions; stop means for halting said line at said junction; securing means positioned adjacent said junction and adapted to clamp and unclamp an intermediate portion of said line; a transfer means adjacent said junction, said transfer means being adapted to move the end portion of said line of articles next said stop means transversely onto said other leg portion, said transfer means being operatively associated with said securing means and said stop means; and switch operating means associated with said stop means for actuating said transfer means, said operating means being rendered operative by a predetermined force exerted by said line of articles whereupon the operation of said switch means actuates the transfer means causing the stop means to recede as the securing means clamps the intermediate portion of the line of said articles so that the end portion of the line between the stop means and the securing means is moved slightly and into position whereby the transfer means engages the same and pushes said end portion transversely onto said other leg portions.

5. An apparatus for carrying individual unit articles along a predetermined path in a predetermined manner comprising a conveying means having angularly disposed leg portions, said leg portions having juxtaposed end portions forming a junction thereat; driving means for causing said articles to travel in abutting relationship one after the other successively in line along one of said leg portions; stop means for halting said line at said junction; securing means positioned adjacent said junction and adapted to clamp and unclamp an intermediate portion of said line; a transfer means adjacent said junction, said transfer means being adapted to move the end portion of said line of articles next said stop means transversely onto said other leg portion, said transfer means being operatively associated with said securing means and said stop means; switch operating means associated with said stop means for actuating said transfer means whereupon the operation of the latter causes the stop means to recede as the securing means clamps the intermediate portion of the line of said articles against movement toward said junction, said recession of the stop means allowing the driving means to move the end portion of the line between the stop means and the securing means into position so that the transfer means engages the end portion of the line whereby the friction between the line and the moving end portion thereof is eliminated when the end portion of the line is transversely positioned onto said other leg portion; and means for moving said disposed end portion away from said junction.

6. An apparatus for carrying individual unit articles along a predetermined path in a predetermined manner comprising a conveying means having angularly disposed leg portions, said leg portions having juxtaposed end portions forming a junction thereat; driving means for causing said articles to travel in abutting relationship one after the other successively in line along one of said leg portions toward said junction; stop means for halting said line at said junction; securing means positioned adjacent said junction and adapted to clamp and unclamp an intermediate portion of said line; a transfer means adjacent said junction, said transfer means being adapted to move the end portion of said line of articles next said stop means transversely onto said other leg portion, said transfer means being operatively associated with said securing means and said stop means; switch operating means associated with said stop means for actuating said transfer means whereupon the operation of the latter causes the stop means to be displaced as the securing means clamps the intermediate portion of the line of said articles against movement toward said junction, said displacement of the stop means allowing the driving means to move the end portion of the line between the stop means and the securing means into position whereupon the transfer means engages the end portion of the line whereby the friction between the line and the end portion thereof is eliminated when the end portion of the line is transversely positioned onto said other leg portion; means for moving said disposed end portion away from said junction; and switch means returning said transfer means to inoperative position whereupon the securing means is unclamped to allow the line to move toward said junction.

7. The invention as defined in claim 1 wherein the securing means includes a clamp movably mounted adjacent the transfer means; means normally urging said clamp into clamping position against an intermediate portion of said line of articles; and holding means operatively connected to said transfer means, said holding means biasing said clamp in unclamped position when said transfer means is rendered inoperative and releasing said clamp when said transfer means is actuated.

8. The invention as defined in claim 1 wherein the stop means includes a support movably mounted adjacent the junction, said operating means for actuating said transfer means being movably mounted on said support; a stop plate mounted on said support movable relative thereto, when a predetermined force is applied to displace the same an amount sufficient to actuate said operating means for moving said transfer means; and means connected to the latter to move said stop means in the direction of said line a predetermined amount so that the end portion of said line is spaced from said intermediate portion thereof as the stop plate is moved so that the end portion can be transversely displaced.

9. The invention as defined in claim 1 wherein the stop means includes a support movably mounted adjacent the junction, said operating means for actuating said transfer means being mounted on said support to move therewith; a stop plate mounted on said support movable relative thereto, said plate having an actuator for engaging said operating means when a predetermined force is applied thereto by said line to displace the stop plate an amount sufficient for the actuator to actuate said operating means for moving said transfer means; and means connected to the latter to move said stop means in the direction of said line a predetermined amount so that end portion of said line is spaced from said intermediate portion thereof so that the former portion can be transversely displaced by said transfer means.

10. The invention as defined in claim 1 wherein the stop means includes a support movably mounted adjacent the junction, said operating means for actuating said transfer means being movably mounted on said support; a stop plate mounted on said support movable relative thereto, said plate having an actuator for engaging said operating means when a predetermined force is applied to displace the same an amount sufficient to actuate said operating means for moving said transfer means; means connected to the latter to move said stop means in the direction of said line a predetermined amount so that the end portion of said line is spaced from said intermediate portion thereof so that said end portion can be transversely displaced by said transfer means; and limit means for limiting the movement of said stop plate, said limiting means causing said transfer means to return to inoperative position after said end portion is transversely moved.

References Cited in the file of this patent

UNITED STATES PATENTS

| | | |
|---|---|---|
| 646,469 | Sleeper | Apr. 3, 1900 |
| 1,142,025 | Christoe | June 8, 1915 |
| 1,980,411 | Kimball | Nov. 13, 1934 |
| 2,090,129 | Kimball | Aug. 17, 1937 |
| 2,183,163 | Howard | Dec. 12, 1939 |
| 2,690,832 | Salter | Oct. 5, 1954 |
| 2,790,531 | McVicker | Apr. 30, 1957 |